United States Patent

Chace et al.

[15] 3,701,113

[45] Oct. 24, 1972

[54] ANALYZER FOR SEQUENCER CONTROLLER

[72] Inventors: Donald E. Chace, Concord; James A. Melvin, Jr., Norwood, both of Mass.; Alan W. Ricketts, Jr., Derry, N.H.; Edward P. Steinberger, Marlboro; David T. Symmes, Danvers, both of Mass.

[73] Assignee: Digital Equipment Corporation, Maynard, Mass.

[22] Filed: Aug. 13, 1971

[21] Appl. No.: 171,542

[52] U.S. Cl...........................340/172.5, 235/151.11

[51] Int. Cl........G06f 15/46, G05b 11/32, G05b 1/01

[58] Field of Search....340/172.5; 235/151.1, 151.11

[56] References Cited

UNITED STATES PATENTS

| | | |
|---|---|---|
| 3,275,988 | 9/1966 | Yetter....................340/172.5 |
| 3,344,406 | 9/1967 | Vinal......................340/172.5 |
| 3,361,897 | 1/1968 | Rush.....................235/150.21 |
| 3,430,206 | 2/1969 | Ernyei et al. ...........340/172.5 |
| 3,465,298 | 9/1969 | LaDuke et al. ..........340/172.5 |
| 3,555,252 | 1/1971 | Garden...................235/151.1 |
| 3,568,161 | 3/1971 | Knickel .................340/172.5 |
| 3,611,311 | 10/1971 | Andrews.................340/172.5 |
| 3,622,767 | 11/1971 | Koepcke.................235/150.1 |
| 3,624,611 | 11/1971 | Wirsing ..................340/172.5 |
| 3,651,477 | 3/1971 | Bartlett et al.......235/151.1 X |

*Primary Examiner*—Paul J. Henon
*Assistant Examiner*—Jan E. Rhoads
*Attorney*—Cesari and McKenna

[57] ABSTRACT

A monitor for a programmed sequence of operations. A sequence controller responds to successive instructions. Some instructions correspond to elements of governing functions and test the status of independent variables to activate controllable devices, which correspond to dependent variables, when functions are satisfied. The monitor, operating in synchronism with the controller, generates a transition word each time the controller either (1) tests a sensor for an independent variable in the function or (2) prepares to alter a controllable device, if a comparison with the last condition of that sensor or device in a memory unit indicates a change has occurred or will occur. The monitor also updates this memory unit to the new condition. Each transition word identifies the changing element and describes the change. A data processing system stores each transition word in sequence for comparison with a reference list of transition sequences.

16 Claims, 8 Drawing Figures

ANALYZER FOR SEQUENCER CONTROLLER

BACKGROUND OF THE INVENTION

This invention relates to the control of operations which occur in a programmed sequence. More specifically, it relates to the analysis of such operations especially when utilized with automatic machine tool controls.

There are systems for controlling machine tools. One system, employed to produce finished parts which are duplicated many times, makes use of a set of condition sensors, such as limit switches, that sense the arrival of various machine tool components at their limits of travel during various operations. These sensors are connected with controllable devices in the machine tool and control relays to control the states of the controllable devices in accordance with various logical functions governing the respective operations. At any given time, the combination of energized and de-energized sensors, relays and controllable devices correspond to a given machine state. Thus, each time a sensor output changes, a new machine state exists which may require a controllable device to initiate a new machine tool operation.

A new sequentially operating controller performs the functions of these relay control systems while greatly simplifying the control system. This controller includes a memory for storing various sensor testing, controllable device setting and control instructions which are grouped as governing functions which define specific machine tool operations. These functions are in terms of Boolean expressions. For example, if the controller is to turn on a controllable device, such as a switch Y1 when a limit switch X1 is ON (TRUE) and either a limit switch X2 or a limit switch X3 is OFF (FALSE), the function is represented by the Boolean expression:

$$Y1 = X1\,(\overline{X2} + \overline{X3})$$

Each such expression defines a specific machine tool operation. A group of these expressions, usually arranged in a sequence corresponding to the actual operating sequence for the machine tool, constitutes a part program which defines all the necessary machine tool operations for making a single part. The controller iteratively processes the entire part program on an element-by-element basis while a part is being made. Whenever any specific Boolean expression is satisfied by the tested conditions, the controller may alter one or more controllable devices, as by turning a device ON or OFF. Otherwise, the controller merely proceeds to the next expression in sequence.

This newer controller is materially more reliable than prior controllers. However, a significant majority of machine tool malfunctions still exist, largely due to limit switch and controllable device failures. These malfunctions may be complete and cause complete machine tool shutdown. They may also be intermittent, however. Intermittent malfunctions during a part program may not produce a bad part.

The diagnosis of both types of malfunctions is extremely difficult. In accordance with one of the more reliable diagnostic procedures for relay control systems, an experienced operator listens to relay clatter for changes in the relay noise pattern. However, this approach is not readily adapted to use with the new sequential controllers.

Automatic diagnostic procedures also exist, but are not readily adapted for machine tools with sequential controllers. In order for such procedures to be effective, the sequential controller and the data processing system, which implements the procedure, should be synchronized to accurately relate their respective operations. Unfortunately, the controllers usually run asynchronously and independently of data processing systems, so some method of "synchronizing" must be employed. For example, the controller might interrupt the data processing system after executing each instruction and then delay any further testing operations until the data processing system processes the interruption. These delays could slow the controller operation to the point where the time the controller needs to process all its instructions during one iteration is significant in comparison with machine tool operating intervals.

Another analysis approach requires a data processing system which includes sophisticated and expensive diagnostic programs specially prepared for a specific machine tool part program. However, the specific nature of the program detracts from a fundamental advantage of a sequential controller. That is, a part program change merely requires a memory circuit board substitution. With special diagnostic programs, the change is complicated because someone must substitute a new diagnostic program which corresponds to the new part program. Further, the expense of these sophisticated programs makes them uneconomical for use with sequential controllers. In fact, one diagnostic program could cost more than the controller itself.

Therefore, it is an object of the present invention to provide a universally applicable operation analyzer.

It is another object of this invention to provide a universal analyzer which does not significantly affect machine tool operation.

It is another object of this invention to provide a machine tool system analyzer which simplifies diagnostic procedures.

Yet another object of this invention is to provide a machine tool operation analyzer which facilitates an analysis of machine tool operation.

SUMMARY

In accordance with one aspect of our invention, we add a transition monitor to a sequential controller. The monitor stores signals on a dynamic basis. Each signal represents the condition of a respective limit switch when last tested or, in the case of a controllable device, last actuated. Collectively, the monitor stores the dynamic status of the machine tool.

As the controller processes each instruction, the monitor compares the tested or desired condition and the corresponding stored condition. If the conditions differ, a change has occurred or is about to occur. The monitor responds by loading an output register with a transition word which identifies the sensor or controllable device and the nature of the transitions. The monitor also updates the stored dynamic condition. If no change occurs, the monitor merely waits for the controller to process the next instruction.

Typically, a data processing system operates in conjunction with the monitor and stores a reference list in its memory. The reference list is a record of the sequence of transitions of some preceding machine tool part program, normally an operating part program which did produce a good part. Each time the transition word appears in the output register, the data processing system stores the word in a second, or current, list. If a malfunction occurs, the operator compares the two lists to locate variations in the two stored transition sequences.

The monitor is connected to the controller and not to the machine tool itself. Hence, part program changes do not affect the monitor. As the transition monitor only transfers information regarding transitions to the output register, the number of exchanges with the data processing system are reduced significantly. This reduction occurs because an instruction normally does not sense or initiate a change. Therefore, operating delays, which could otherwise occur, are minimized.

This invention is pointed out with particularity in the appended claims. The above and further objects and advantages of this invention may be more fully understood by referring to the following description taken in conjunction with the accompanying drawings.

DESCRIPTION OF AN ILLUSTRATIVE EMBODIMENT

Figure 1:
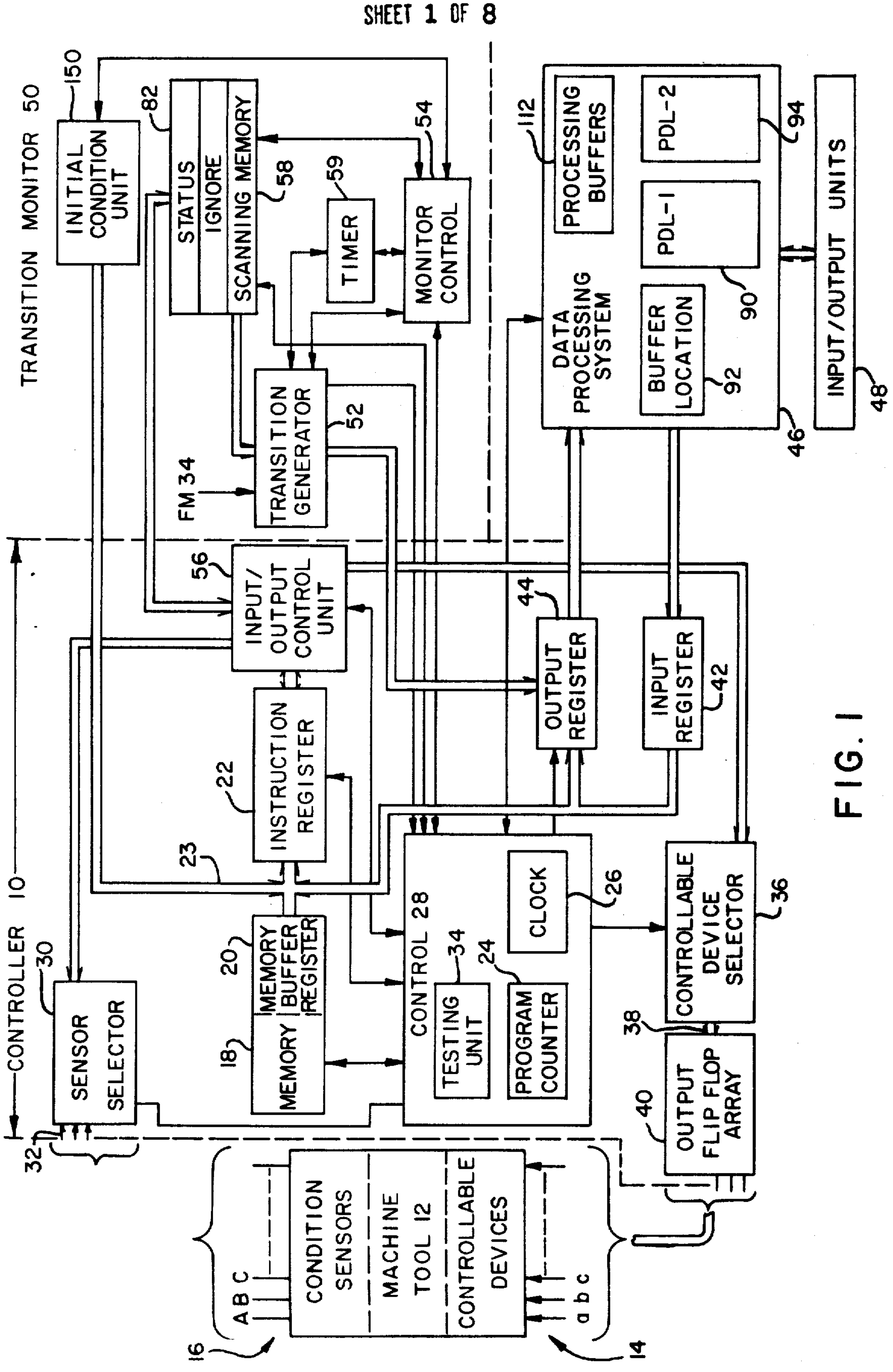
FIG. 1 is a diagram of a sequential controller with an analyzer embodying our invention.

FIG. 1 shows a machine tool controller which can handle a Boolean expression or a governing function written in any arbitrary form with any number of variables and any arrangement of logical operations connecting variables or groups of variables. This system is more fully described in a co-pending patent application, (83–074M), entitled CONTROL SYSTEM and assigned to the assignee of the present invention.

Controller 10 controls the operation of a device such as a machine tool 12. The machine tool 12 has a set of identified input terminals 14*a*, 14*b*, etc., which are energized to carry out various machine operations. Typically, voltages applied to the terminals 14 energize motors, clutches, actuating solenoids or other controllable devices to provide mechanical power for the respective machine operations.

The machine tool 12 also includes a set of condition sensors 16 that collectively indicate the status of the machine. The sensors generally take the form of switches located for actuation by movable components on the machine tool when the components reach predetermined positions. Thus, each sensor provides "ON" or "OFF" signals depending on whether or not it is actuated by the movable component whose position it senses. The sensor outputs appear at a set of identified sensor terminals 16A, 16B, etc.

The machine tool input terminals 14 are energized by the controller 10 according to the machine status as represented by the voltages appearing at the sensor terminals 16.

The controller 10 includes a memory 18 and a memory buffer register 20. An instruction register 22 receives instructions from the memory buffer register 20 over a bus 23 under the control of a program counter 24 (which also doubles as a memory address register) and a clock 26 in a control 28.

A sensor selector 30 has a set of input terminals 32 connected to the respective sensor terminals 16. The selector 30 selects a single terminal in response to an identifying number or address contained in the instruction register 22 and gates the signal from the corresponding sensor to a single output terminal connected to a testing unit 34 in the control 28. Conversely, a controllable device selector 36 responds to a setting instruction and an address in the instruction register 22 by energizing a single one of its output terminals 38 to set or reset a single flip-flop in an output flip-flop array 40.

The unit 34 tests the signal from the sensor selector 30, which represents the state of the selected machine tool sensor to see if it is a ONE or ZERO and produces a TRUE or FALSE output depending upon the instruction. When the controller 10 processes an instruction for activating a specific flip-flop in the array 40, a signal conveyed from the control 28 to the selector 36 indicates whether the flip-flop will be set or reset.

The memory 18, which is ordinarily a "read-only" memory, stores all the governing functions for the machine tool 12. The program counter 24 continually cycles through all the instructions to transfer each instruction to the register 22 periodically. The internal speed of the controller 10 is much greater than the speed of the various mechanical and electro-mechanical elements of the machine tool 12. Consequently, insofar as the machine tool is concerned, the commands to the machine tool are transmitted essentially instantaneously after the occurrence of the sensor conditions upon which the commands are predicated, even with the controller 10 repetitively stepping through all the governing functions which constitute a part program.

It is also apparent that the outputs of certain flip-flops in the array 40 can be connected directly to input terminals 32 of the sensor selector 30 or as a separate class of inputs. We elect to include a special class of instructions for testing outputs of these flip-flops as described later.

FIG. 1 shows an input register 42 and an output register 44, conveniently located in the controller 10, coupled to the bus 23 and to a data processing system 46 which also communicates with input/output units 48. These registers 42 and 44 are conventional; they transfer data to or from the data processing system 46 onto the bus 23 for such purposes as "debugging" operations.

A transition monitor 50 constitutes the analyzer and includes a transition generator 52 for transmitting transition words to the output register 44 for transfer to the data processing system 46. One input to the transition generator 52 is from the testing unit 34.

Signals from the control 28 also energize a monitor control 54 and input/output control unit 56 to enable a scanning memory unit 58 to receive an address through the unit 56. The scanning memory unit 58 decodes the address and generates a signal indicating the state of the selected sensor or controllable device as stored in a corresponding location. The transition generator 52 combines this signal and the signal from the testing unit 34 in an exclusive OR operation. If there is an output, a transition has occurred; so the generator 52 produces a transition word and signals the control 28 to enable the output register 44 to accept the transition word. This acceptance occurs if the output register 44 is empty or a stall timer 59 (described later) has completed a time interval.

In one specific embodiment, the transition word includes 12 bits. Nine bits identify a condition sensor or controllable device and are obtained from the instruction register 22 through the input/output control unit 56. Other signals in the controller 10 and transition monitor 50 indicate whether the instruction is a testing, activating or control instruction; and still other circuits generate a bit indicating whether a sensor or controllable device is addressed by the instruction and another bit indicating the direction of the transition (i.e., to OFF or to ON).

Figure 2:
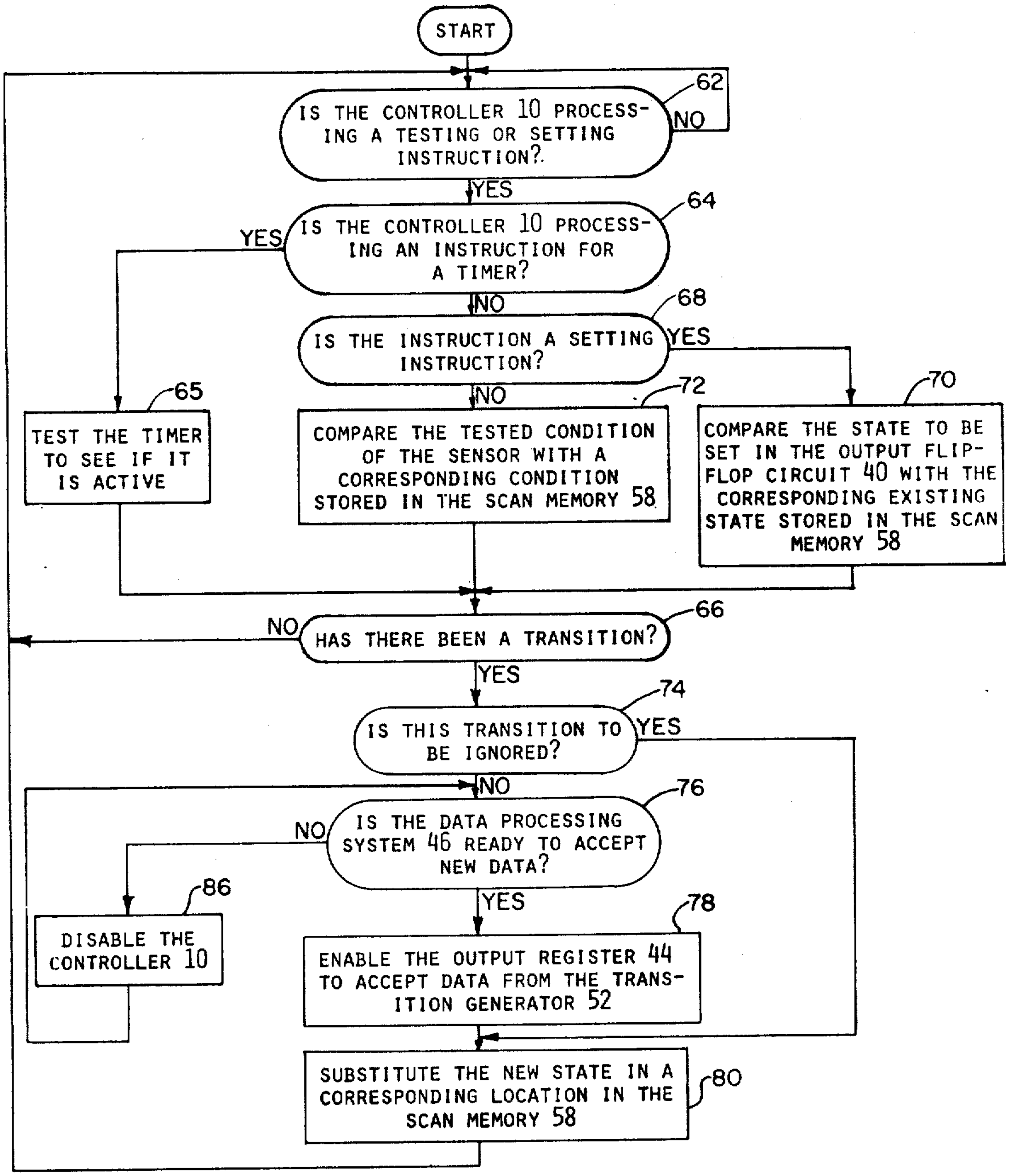
FIG. 2 is a flow diagram to illustrate the general operation of the analyzer shown in FIG. 1.

FIGS. 1 and 2 together show the interaction between the controller 10 and the transition monitor 50 more clearly. Consider that the control 28 defines a fetch state and an execute state. During the fetch state, the control 28 moves an instruction identified by the program counter 24 to the instruction register 22 in a known manner. Then the control 28 begins an execute cycle which defines a fixed delay time. After the delay, the control 28 generates a strobing pulse to actuate the testing unit 34 or the output selector 36.

When the control 28 starts the execute cycle, the monitor control 56 receives signals which represent the instruction in register 22. If the instruction is other than a testing or actuating instruction (STEP 62), the monitor control 56 merely awaits the next instruction. If the register 22 contains a testing or setting instruction, the monitor control 56 enables the scanning memory 58 to decode the address in the register 22 and, from information stored in the memory unit 58, determine whether the selected controllable device is a timer (STEP 64). A timer is a special class of device which defines some machine tool interval. It must be energized, complete the time interval and be reset before it can be tested validly. The test (STEP 65) verifies that a test of the timer will be valid.

Other instructions are tested to determine whether they are normal setting instructions (STEP 68). If they are, the transition generator 52 obtains signals from the scanning memory 58 indicating the present state of the specified flip-flop in the output flip-flop array 40. These are compared with a signal from the control 28 indicating what effect the instruction will have (STEP 70). If the instruction is a testing instruction the transition generator 52 compares signals indicating the previous state of the sensor from the scanning memory 58 and the tested condition from control 28 (STEP 72).

Once any of the three steps (65, 70 or 72) occur, the transition generator 52 compares the two signals. If they are identical, the transition generator 52 awaits the execution of the next instruction (STEP 66) by preparing its next iteration starting at STEP 62.

When there is a transition, the system performs two tests. In STEP 74, the system determines whether the transition is to be ignored and, in STEP 76, whether the output register 44 can accept new data. Assuming for the moment that both tests are satisfied, the control 28 receives a signal from the transition generator 52 and enables the output register 44 to accept an output (i.e., a transition word) (STEP 78). The control 28 also generates an interrupting signal for altering the data processing system that the output register 44 contains data. Then the monitor control 56 alters the contents of the scanning memory 58 to indicate the new status (STEP 80).

As shown in STEP 74, certain transitions can be ignored. A status register 82 associated with the scanning memory 58 stores a status word. In one status word, designated bits, when set, have the following meanings:

| Bit No. | Meaning |
|---|---|
| 0 | Turn on automatic scanning operation (described later) |
| 1 | Turn on program scanning operation (described later) |
| 2 | Ignore output transitions to off |
| 3 | Ignore output transitions to on |
| 4 | Ignore input transitions to off |
| 5 | Ignore input transitions to on |

The monitor 56 responds to a particular word in the status register 82 by applying appropriate signals to the transition generator 52. As will be apparent, the data processing system 46 or the memory 18 can be programmed to change the status word during normal operation. Furthermore, this function may complement transition omissions which can be defined by programs in the data processing system 46.

If the transition is not to be ignored, it is necessary to determine whether the data processing system 46 is ready to accept new data (STEP 76). If internal conditions prevent the data processing system 46 from accepting data in the output register 44 from a previous transition, the transition monitor 50 disables the control 28 (STEP 86) to prevent any further operations until a predetermined time elapses or the output register 44 empties, whichever is sooner (STEP 78).

Each time the transition monitor 50 senses a transition, the generator 52 produces a word identifying the device, direction of transition and other information moves to the data processing system 46 for chronological storage in a push-down list 90 through an intermediate buffer location 92. Then the processor can compare the current list PDL-1 list 90 and a reference list PDL-2 list 91 and transfer data relating to deviations in the two transition sequences to the input/output units 48.

Figure 3:
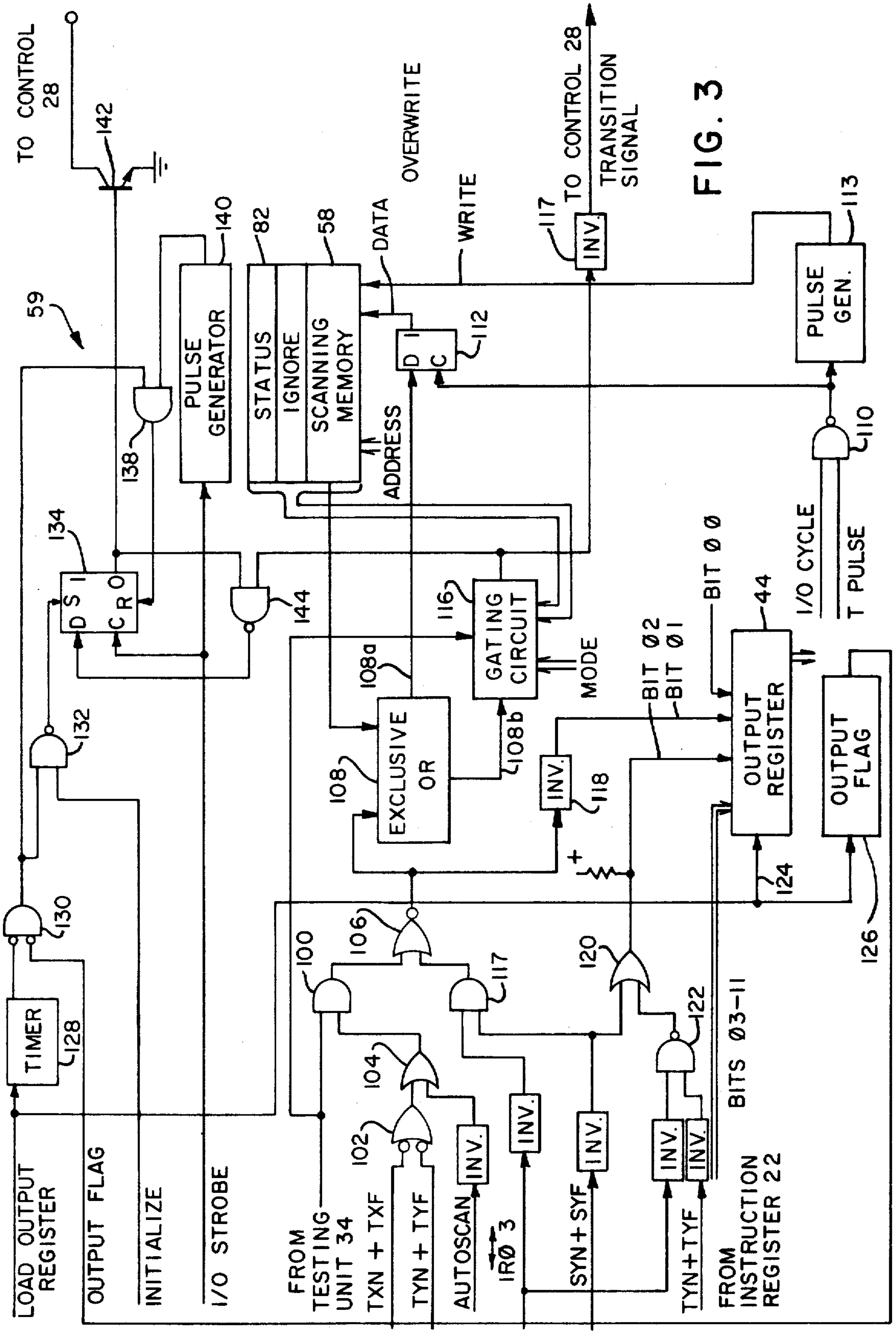
FIG. 3 is a detailed diagram of the transition monitor used in the analyzer shown in FIG. 1.

FIG. 3 is a specific embodiment of the transition monitor 50. Consider the following class of instructions executed by the controller 10:

CONTROLLER INSTRUCTIONS

| Bit Locations 00 01 02 03 04–11 | FUNCTION |
|---|---|

| | | | |
|---|---|---|---|
| TRR 0 0 0 | | Loads scanning counter | |
| TYN 0 0 1 1 | A | Tests selected output | —for "ON" |
| TYF 0 0 1 0 | | | —for "OFF" |
| TXN 0 1 0 1 | D | Tests selected sensor | —for "ON" |
| TXF 0 1 0 0 | D | Tests selected sensor | — for "OFF" |
| SYN 0 1 1 1 | R | Sets selected output | — to "ON" |
| SYF 0 1 1 0 | | | —to "OFF" |
| . | E | | |
| . | | | |
| . | | | |
| TXD 1 1 1 0 | S | Determines status | — Of Sensor |
| TYD 1 1 1 0 | S | | — Of Output |

With respect to FIG. 3 where ground assertion signals are assumed unles otherwise noted, the TYN, TYF, TXN, TXF, SYN and SYF instructions are pertinent; and the control 28 (FIG. 1) generates appropriate signals corresponding to the instructions. Any one of the first four instructions causes the controller 10 to couple a positive assertion logic signal from the testing unit 34 indicating the status of a selected sensor or output to an AND circuit 100. The corresponding instruction signal energizes a NOR circuit 102 and, through an OR circuit 104, enables the AND circuit 100 to pass the status signal to a NOR circuit 106. In turn, the NOR circuit 106 provides one ground assertion input signal to an exclusive OR circuit 108. The other input to the exclusive OR circuit 108 is a ground assertion signal from the scanning memory 58 which appears when the monitor 56 enables the memory 58, usually as soon as the ADDRESS signals are decoded.

The exclusive OR circuit 108 also produces a positive assertion signal on a conductor **108*a* when (1) the tested sensor or output is ON or (2) an output is to be set. A clocking signal from a NAND circuit 110 in response to the correspondence of an I/O cycle signal and T pulse from the controller 10 sets a flip-flop 112 if the conductor 108a is energized. A pulse generator 113 provides a pulse for writing the new data bit into the location in the scanning memory 58** identified by the ADDRESS signals. Hence, these circuits update the scanning memory to reflect the new status of the machine tool.

A gating circuit 116 receives a positive assertion signal from the exclusive OR circuit 108 over a conductor **108*b* and responds to MODE and IGNORE signals. If the system is in its normal program scanning mode (described later), and if the status register 82 does not contain a bit indicating the transition is to be ignored, the gating circuit 116 couples a TRANSITION SIGNAL through an inverter 117 for transmission to the control 28 indicating that the transition has occurred. This signal lasts until the monitor control 56 updates the scanning memory 58, whereupon the exclusive OR circuit 108** terminates its output.

NOR circuit 106 together with an AND circuit 117 supplies information for BIT01 in the output register 44 through an inverter 118. The resulting signal sets BIT01 if the tested status is ON. As the output register 44 only produces a word after a transition occurs, BIT01 indicates an OFF-to-ON transition when set and an ON-to-OFF transition when cleared.

An OR circuit 120 and a NAND circuit 122 set or clear BIT02. They set BIT02 if the transition is detected in response to any instruction which addresses one of the flip-flops in the array 40. BIT02 is cleared for other instructions.

When the control 28 (FIG. 1) receives a transition signal, it subsequently generates a LOAD OUTPUT REGISTER pulse. This pulse energizes input gating circuits in the output register 44 (FIG. 3) over a conductor 124 and sets an output flag 126 indicating that the output register 44 contains data. There is then a finite time before the data processing system accepts data from the output register and clears the output flag 126. This time may exceed the controller cycle time. No problems exist, however, unless another transition is monitored. Then the controller normally must prevent the new transition word from overwriting the previous transition word in the output register 44.

The stall timing circuit 59 shown in FIG. 3, performs this function. That is, it allows the controller 10 to continue operating while the output register 44 contains a transition word until the next transition occurs. Then the stall timer circuit 59 stops controller operation until (1) the data processing system actually receives the data or (2) a predetermined time elapses, whichever is less.

Specifically, each time the controller 10 produces a LOAD OUTPUT REGISTER pulse following an I/O STROBE pulse, it simultaneously gates the data into the output register 44 and energizes a timer 128. The timer 128 defines an interval which is slightly greater than the maximum time the data processing system should require to transfer data from the output register 44. When both the timer 128 and the output flag 126 are energized, a NOR circuit 130 disables a NAND circuit 132 and removes a positive assertion level SET signal from an input (S) to a flip-flop 134. The NOR circuit 130 simultaneously enables an AND circuit 138 in the reset circuit for the flip-flop 134. As apparent, this operation is disabled by an INITIALIZE signal coupled to NAND circuit 132.

The leading edge of each successive I/O strobe pulse from the controller 10 causes a pulse generator 140 to generate a positive assertion pulse and energize the AND circuit 138 to thereby reset the flip-flop 134. Resetting the flip-flop 134 turns on a transistor 142 and prevents the generation of T and LOAD OUTPUT REGISTER pulses at the end of the I/O STROBE pulse. However, this controller interruption only continues if the following trailing edges of I/O STROBE pulses are accompanied by a transition signal (i.e., the gating circuit 116 and the reset output of the flip-flop 134 both energize an AND circuit 144). If another transition occurs while the output register 44 contains data (indicated by a reset flip-flop 134), NAND circuit 144 produces a non-assertive output for the flip-flop 134. Therefore, the trailing edge of the I/O STROBE pulse, which acts as a clocking pulse for the flip-flop 134, cannot set the flip-flop 134. As a result, the T and LOAD OUTPUT REGISTER pulses are disabled.

On the other hand, if the flip-flop 134 is reset, but no transition occurs, the NAND circuit 144 and trailing edge of the I/O STROBE pulse combine to set the flip-flop 134 and enable the control 28 to issue a T pulse. Therefore, it is apparent that this sequence of resetting the flip-flop 134 by means of the AND circuit 138 and then setting the flip-flop 134 through the NAND circuit 144 continues with each I/O STROBE pulse until the NOR circuit 130 is de-energized either by the timer 128 or by the output flag 126 being reset. When this occurs, the flip-flop 134 receives its level set signal, which overrides subsequent inputs to the clocking input, and remains set continuously.

Therefore, the transition monitor 50 compares the state of each sensor or output which is tested or set with the stored memory contents indicating the previous condition and produces a transition word which is transferred through an output register 44 to the data processing system. Furthermore, the stall timer circuit 59 provides the necessary control normally to prevent overwriting data in the output register 44. However, if there is some system malfunction so the timer 128 times out or the data processor does accept data, the controller is enabled. In the former case, the controller 10 allows the earlier data in the output register 44 to be destroyed.

Figure 4A:
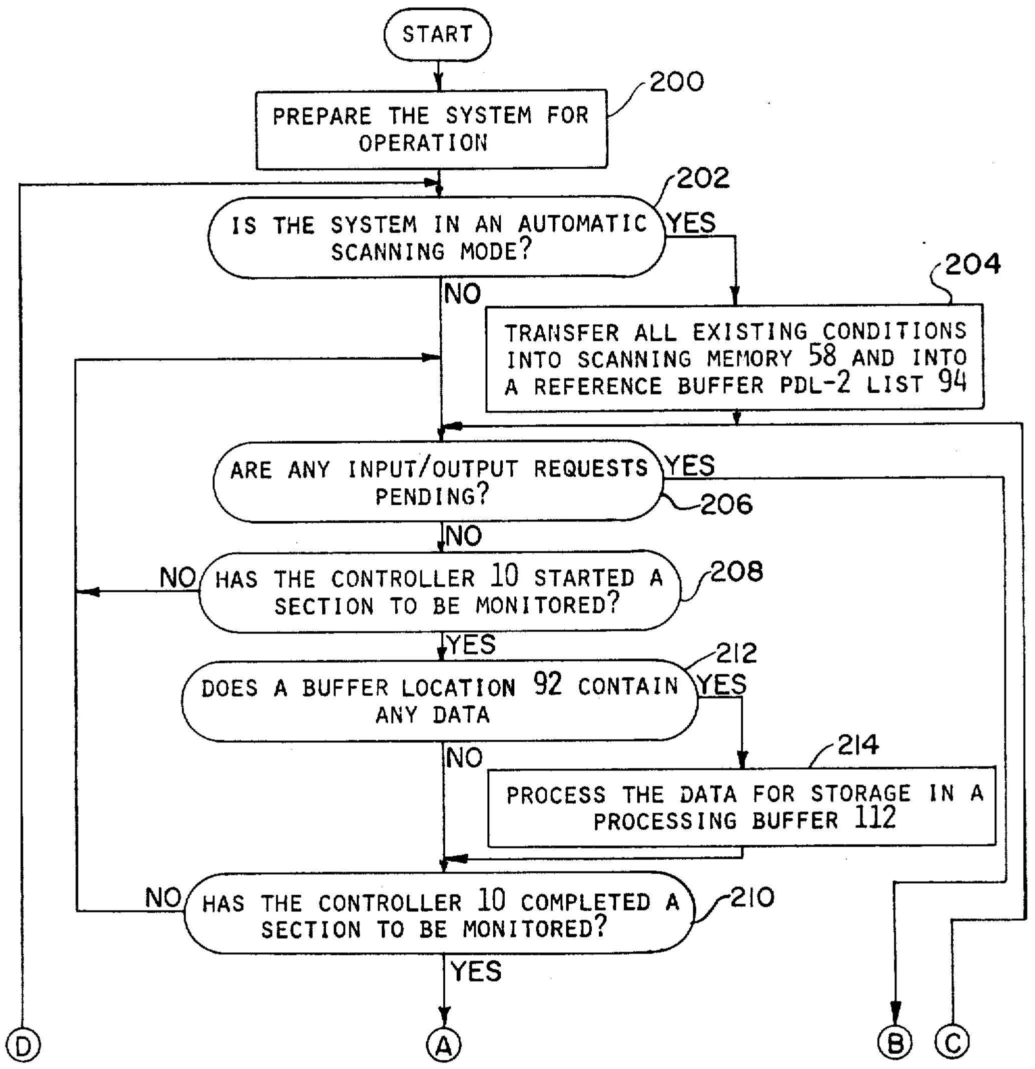
FIG. 4 is a flow diagram to illustrate one way a data processing system can be programmed to utilize the analysis information obtained in accordance with this invention.

FIG. 4 is an operational flow diagram illustrating one program which a data processing system 46 could implement to obtain analytical information from the transition monitor 50.

Once the data processing system 46 is initialized (STEP 200), the system determines if it is to operate in an automatic scanning mode (STEP 202) which provides initial conditions to the scanning memory 58. STEP 204 sets the analyzer to perform this operation which is described later. During a normal program scanning mode which the following steps describe, the system starts at STEP 206 to determine whether any input/output requests exist, as represented by signals at the interrupting facility of the data processing system. Assuming that no such interrupting signal exists, STEPS 208 and 210 provide the ability to monitor selected sections of a part program. Each section is bounded by selected transitions. Until a starting transition is sensed, the data processing system 46 merely returns to STEP 206. After the system 46 receives a starting transition, it examines the buffer location 92 (STEP 212) and processes any data for storage in processing buffers 112 (STEP 214). The exact nature of this processing is not relevant to an understanding of this invention. Suffice it to say, data is processed in accordance with the requirements necessary for printing out final information. This cycle (STEPS 206–210) continues until the data processing system receives an ending transition (STEP 210). This terminates the cycle.

Figure 4B:
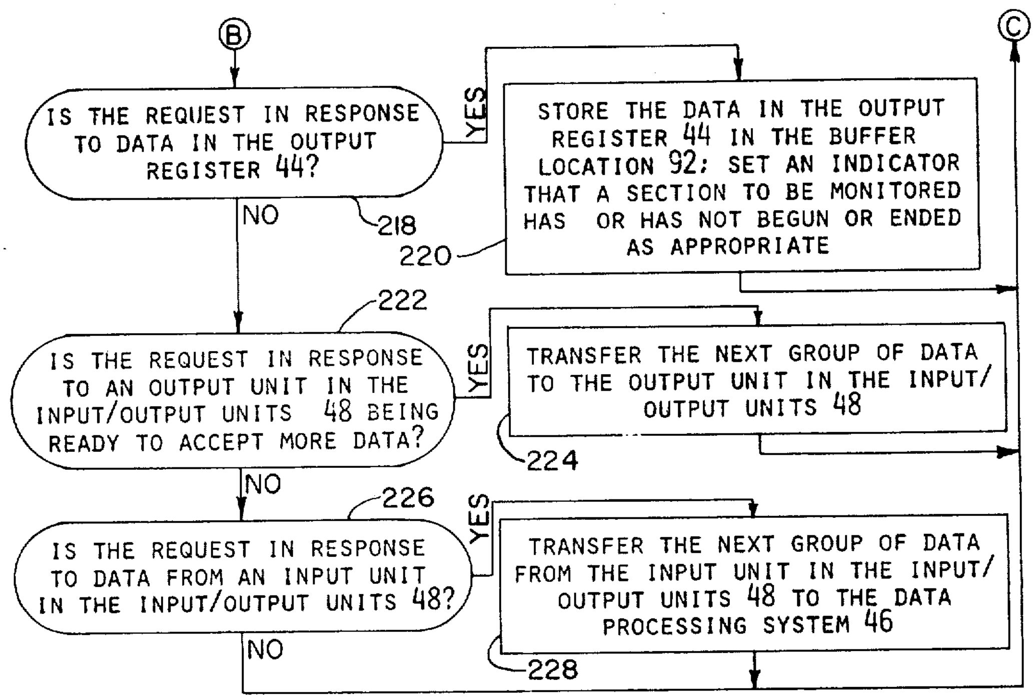

As previously noted, STEP 206 monitors the interruption facility. When a signal exists, the data processing system analyzes the signal and responds accordingly as shown in FIG. 4B. When the output flag 126 is set, STEP 218 diverts the system operation to STEP 220 to (1) transfer the output register contents into the buffer location 92; (2) set an indicator to enable STEP 212 to move the data from the buffer location 92 and (3) determine whether a section has ended.

Signals from the output flag 126 have the highest of three priorities. The second highest priority is awarded to output units in the input/output units 48. If the output unit indicates it is ready to accept more data, the system uses STEPS 222 and 224 to transfer a next group of data as is known in the art. Requests to change data in the data processing system have the lowest priority as signified by STEP 226. When the operator strikes a control key, for example, the system uses STEP 228 to receive and transfer information to appropriate locations. Once these steps are finished, the system returns to STEP 206 to take further action as is appropriate.

Figure 4C:
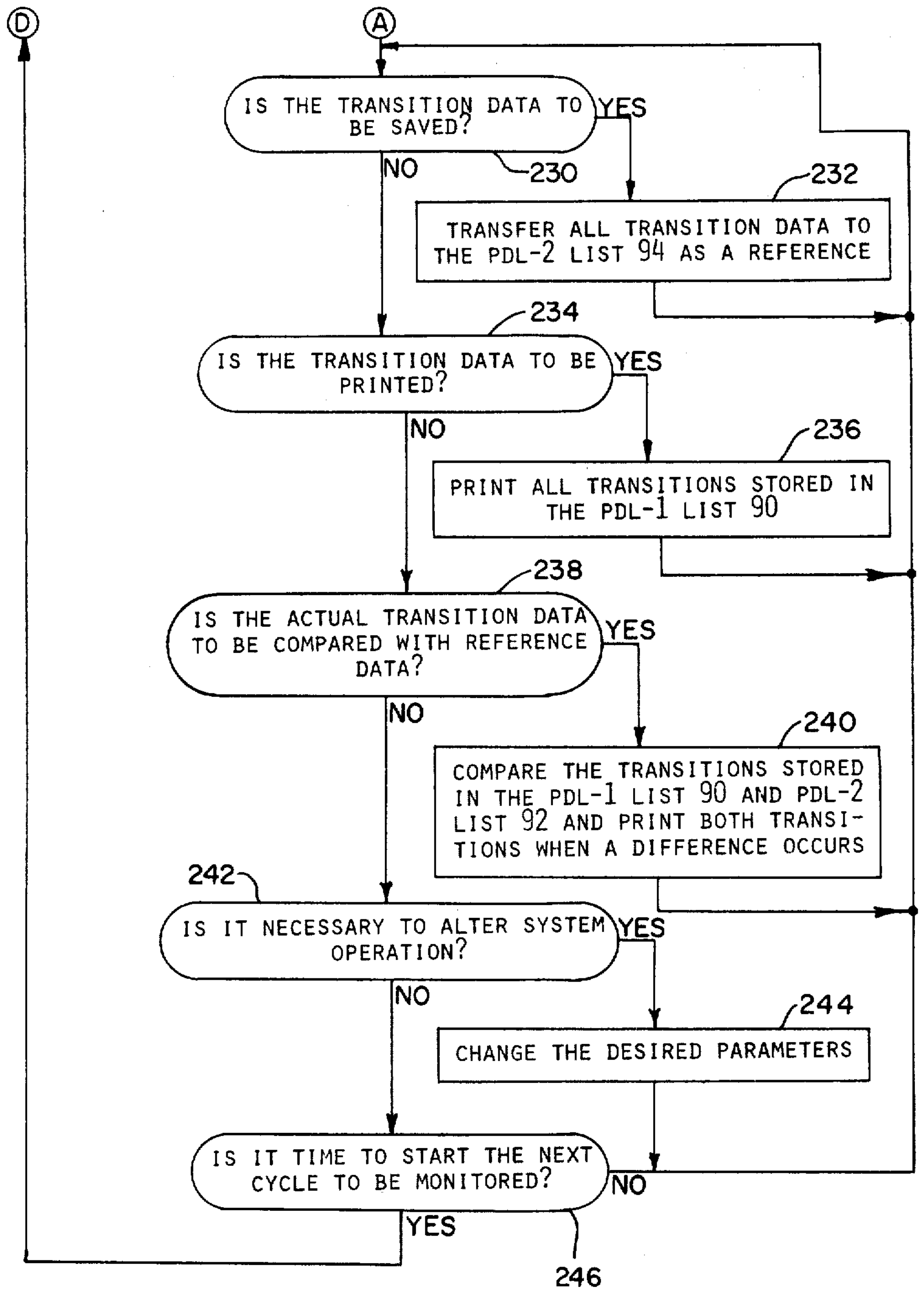

Once the monitoring during the program scanning mode is finished, the PDL-1 list 90 contains transition sequence for that part. It may also contain the actual time each transition occurred. This allows an operator to determine the elapsed-time between transitions and simplifies locating any malfunctions. Next, as shown in FIG. 4C, the system selectively processes this information based upon operator inputs. If the information in the PDL-1 list 90 is to be a reference list for subsequent part programs, STEPS 230 and 232 perform the transfer. This procedure could establish a reference after the operator noted the machine tool had produced a good part. If stored information about each transition is to be printed, STEPS 234 and 236 perform the necessary operations. When only discrepancies in the transition sequence are to be printed (the normal diagnostic procedure), STEP 238 diverts the data processing system 46 to STEP 240. The data processing system 46 then compares corresponding locations in the PDL-1 list 90 and PDL-2 list 94 and prints both the reference and current transition words when a difference is noted. STEP 242 enables the operator to use STEP 244 for changing any necessary parameters. These alter the system during STEP 200 or 206 of a succeeding cycle.

STEPS 230 through 246 constitute a cycle which continues until all the desired information has been provided. They also delay the system in this portion of the program until a new part is to be manufactured. Once this happens, STEP 246 diverts the data processing system back to STEP 206 to begin a new monitoring operation.

Figure 5:
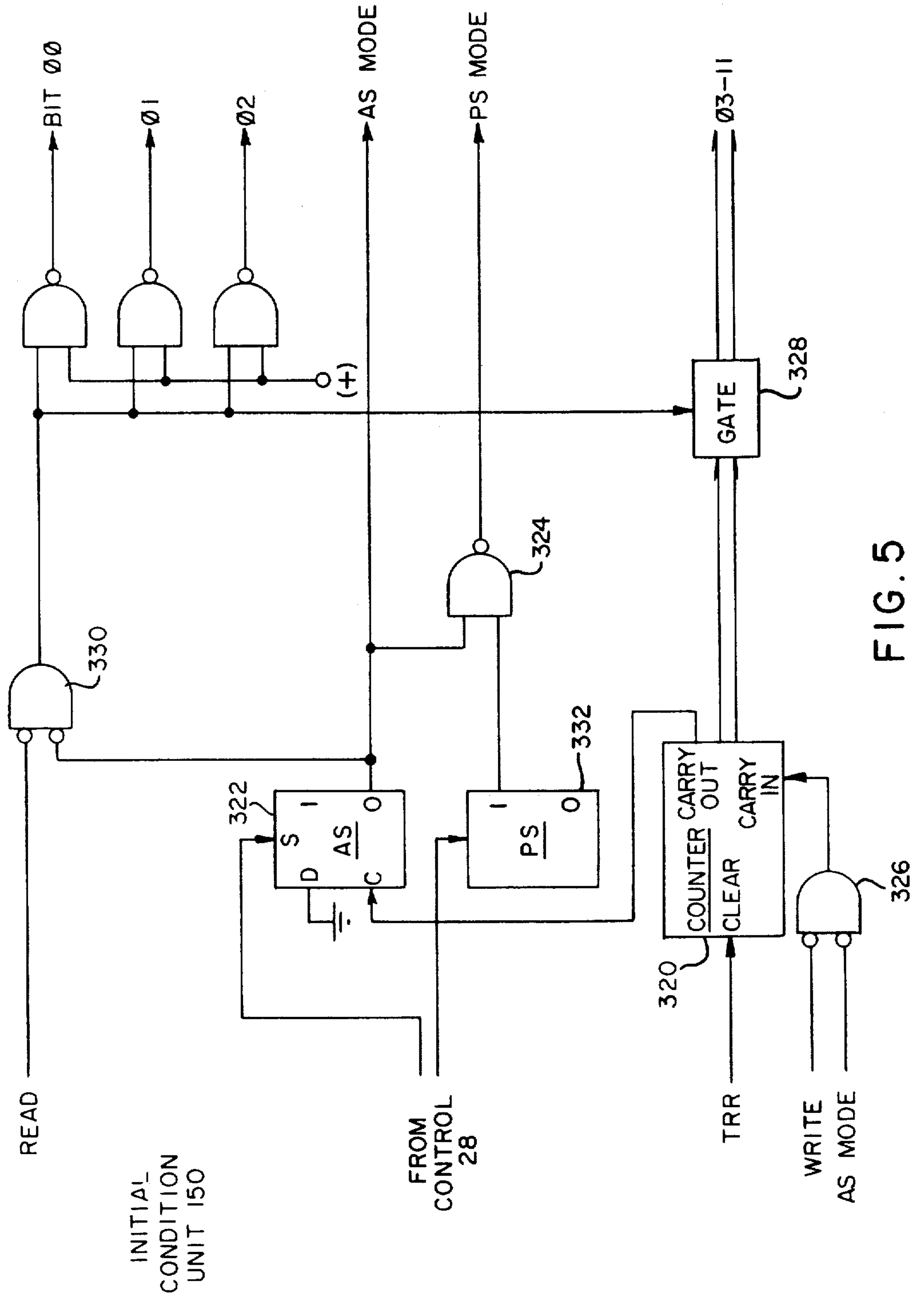
FIG. 5 is a detailed diagram of a circuit used to store initial conditions in the monitor.
Figure 6:
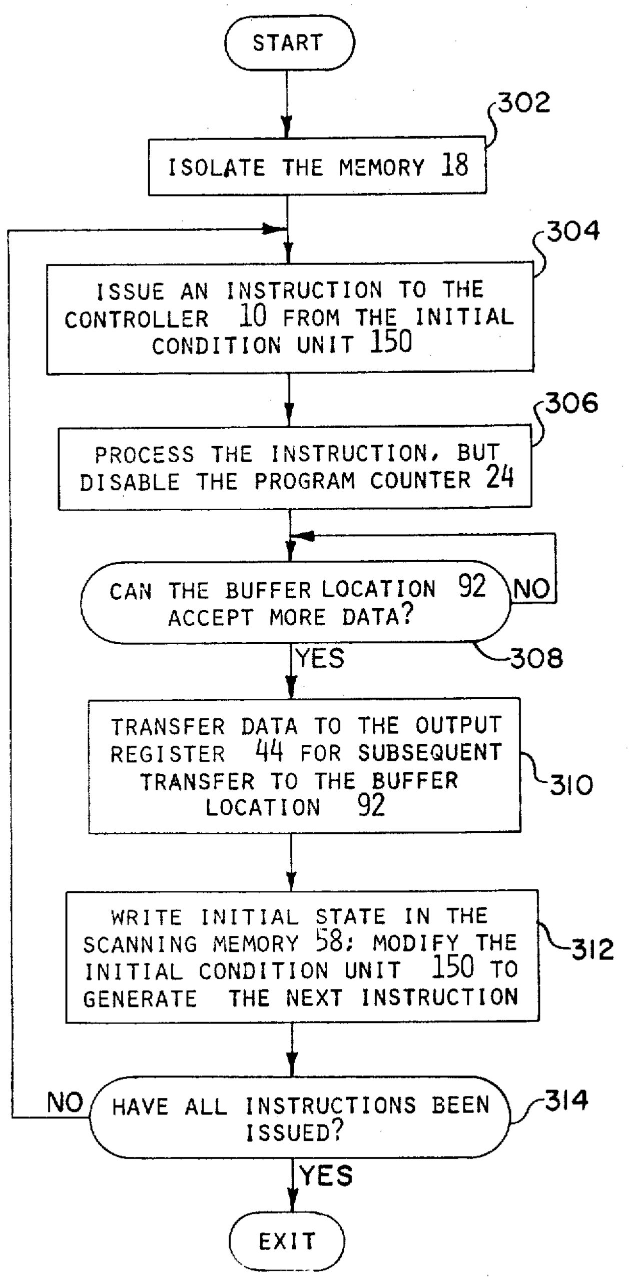
FIG. 6 is a flow diagram of the operation of the circuits shown in FIG. 5.

FIGS. 5 and 6 show the apparatus and operation of circuitry for storing conditions in the scanning memory 58. This operation is the automatic scanning mode and is implemented by the initial condition unit 150 (FIGS. 1 and 5) in conjunction with the monitor control 56. As shown in STEP 302 (FIG. 6) the monitor control 56 and initial condition unit 150 initially synchronize the transition monitor 50 and the controller 10. In addition, the control 28 effectively isolates the memory 18 so the initial condition unit 150 supervises subsequent controller operation by issuing instructions in sequence. Each instruction activates the sensor selector 30 and transfers the existing condition (i.e., ON or OFF) of the selected sensor or controllable device, while disabling the program counter 24 (STEPS 304 and 306).

Next, the system halts until the buffer location 92 is ready to accept more data (STEP 308) as determined by the stall timer circuit 59 and then through the output register 44 to the buffer register 92 (STEP 310). The monitor control 56 generates a WRITE pulse to write the status into the scanning memory 58 at a location defined by the address. Then the monitor control 56 alters the address generated by the initial condition unit 150 to determine the next sensor status in sequence (STEP 312). Once all sensors have been tested, the system exits, normally returning the transition monitor 50 into the program scanning mode (STEP 314).

Hence, in the automatic scanning mode, the monitor obtains the initial status of each sensor and controllable device and sets the scanning memory 58. In this embodiment, the initial conditions transfer from the output register 44 into the data processing system 46 to facilitate subsequent transfer to the input/output units 48.

Now referring to FIG. 5, the initial condition unit 150 comprises a counter 320. When the controller 10 (FIG. 1) receives a specific TRR instruction, it produces a TRR signal which clears the counter 320. This signal may be expressly or implicitly generated either in the controller 10 or in the transition monitor 50. The controller 10 also energizes an AS flip-flop circuit 322 which, when set by a status word from the data processing system 46, indicates the controller is operating in the automatic scanning mode. When the AS flip-flop 322 is set, it generates an AS MODE signal which is one input to the gating circuit 116 (FIG. 4) and which disables a NAND circuit 324. With the AS flip-flop 322 set, a NOR circuit 326 is also enabled so a subsequent WRITE pulse from the pulse generator 140 (FIG. 3) generates a CARRY input to the least significant bit in the counter 320. This advances the counter after the WRITE pulse terminates to identify the next sensor output or flip-flop in sequence. The counter output passes through a gating circuit 328 to the memory buffer 20 (FIG. 1) in response to READ pulses from the controller 10. Each READ pulse energizes a NOR circuit 330 also enabled in the automatic scanning mode by the AS flip-flop 322 to produce negative-going signals on the 00, 01, and 02 conductors of the bus 23. This indicates the existence of a TRR signal.

Referring again to FIG. 3, the AS MODE signal also energizes the OR circuit 104 and the gating circuit 116. During this mode, therefore, the controller operates on each instruction as if it were a testing instruction. As a result, the content of every address of sensor or controllable device can produce a transition word for the output register 44.

There are several ways for terminating the automatic scanning mode. In accordance with one, the most significant bit on the counter 320 energizes the clocking input of the AS flip-flop circuit 322. When the last sensor address is decoded, the next pulse from NOR circuit 326 causes a carry from the counter 320 where it resets the flip-flop circuit 322. If a PS flip-flop 332 has been previously set by a status word, the system automatically transfers to the program scanning mode because NAND circuit 324 is energized. Other methods include directly setting the flip-flops 322 and 332 in response to output instructions issued by the data processing system 46.

In summary, we have described a transition monitor for facilitating the diagnosis of machine tool operations and other programmed sequences of operations under the supervision of a sequential controller. Specifically, we store a preceding state for each sensor or controllable device in a memory at an addressed location. As the controller executes each instruction in sequence, the monitor uses the address generated by the controller to retrieve the appropriate condition signal and compare it with the signal obtained by the controller. When there is a difference, the monitor generates a transition word indicating the device, the direction of transition, and the type of sensor or controllable device. Hence, when the machine tool completes its operation, the data processing system 46 contains the transition sequence which occurred. If any malfunctions occur because the transition sequence varies, it is merely necessary to compare that list with a pre-existing reference list to pinpoint areas where the sequences differ.

It will be apparent that many different circuits and programs can be substituted for the described circuits and programs. Therefore, it is an object of the appended claims to cover all such modifications and variations as come within the true spirit and scope of this invention.

What we claim as new and desire to secure by Letters Patent of the United States is:

1. In a control system of the type including:
 i. a device having a plurality of identified condition sensors and controllable devices, and
 ii. a controller for sequentially comparing each element in a governing function with the condition of a corresponding sensor for altering a controllable device whenever a governing function is satisfied, the improvement of an analyzer for monitoring system operation comprising:
 A. means for storing the last recorded condition for each condition sensor and controllable device,
 B. transition monitoring means connected to said controller and said storage means and synchronized with said controller including
  i. output means for generating an output when the previous and new conditions of a compared condition sensor or controllable device differ, and
  ii. means for updating said storage means to correspond to the new condition, and
 C. means for receiving outputs from said transition monitoring means.

2. A control system as recited in claim 1 wherein said controller additionally includes an output register,
 A. said transition monitoring output means being connected to transfer its output to said output register, and
 B. said receiving means comprising a data processing system with means for accepting an output in said output register and for storing the output in sequence.

3. A control system as recited in claim 1 wherein said transition monitoring output means includes a transition word generator for receiving signals from said controller identifying a condition sensor or controllable device and the type of operation being performed by said controller, said transition word generator comprising:
 i. means for determining the direction of the transition,
 ii. means for determining whether said controller is testing a sensor,
 iii. means for generating a transition word as the output of said transition monitoring output means, the word identifying the transition direction, type of controller operation and the affected device,
 iv. said updating means responding to said transition word generator for altering the contents of said storage means.

4. A control system as recited in claim 1 wherein said controller includes means for storing instructions in sequence and an instruction register, certain instructions each including a first portion received by said instruction register for defining an operation to be performed and a second portion identified by a specific condition sensor or controllable device, A. said storage means including addressed decoding means responsive to selected signals from said instruction register for generating a signal corresponding to a previous state of the identified condition sensor or controllable device, and B. said transition monitor being responsive to said selected signals from said instruction register for enabling said storage means.

5. A control system as recited in claim 4 wherein said receiving means is characterized by a maximum transfer rate at which it can accept data from said output register, said transition monitoring means additionally comprising:

i. timing means for defining a maximum time interval corresponding to the maximum transfer rate, ii. means for starting said timer whenever said receiving means receives an output, iii. means responsive to said timer for inhibiting further sequencing by said controller during the timed interval, and iv. means for resetting the timer when said output register is empty.

6. A control system as recited in claim 4 additionally comprising:

A. means for inhibiting control actions by said controller, and

B. means for causing said controller to sequentially test each sensor and device whereby said storage means and said receiving means obtain initial conditions.

7. A control system as recited in claim 4 wherein said transition monitor additionally comprises:

i. a status register for storing status information, and ii. means for disabling said transition monitoring means output for selected transitions in accordance with the contents of said status register.

8. An automatic machine tool system comprising:

A. a machine tool with a plurality of identified condition sensors and controllable devices for controlling the operation thereof, B. a controller for selectively activating said controllable devices in response to machine tool status indicated by said condition sensors in response to at least one Boolean expression, said controller including:

i. means for sequentially analyzing each element in each expression, each step including comparing the condition of a predetermined condition sensor with a corresponding element in the expression, ii. means responsive to a satisfied expression for altering an identified controllable device, and iii. an output register, C. a data processing system with an input buffer for connection to said output register for receiving data therefrom, and D. a transition monitor connected to said controller including:

i. storage means with locations corresponding to each of said condition sensors and controllable devices for storing data indicating respective conditions thereof, ii. a transition word generator connected to said sequential comparison means and said output register in said controller and to said storage means for generating a word when a change in condition is sensed during each comparison step, the transition word identifying a specific condition sensor or controllable device and the direction of change and being transferred to said output register, said data processing system responsive to the receipt of the transition word in said output register for accepting the transition word in said input buffer and storing the word in sequence.

9. A system as recited in claim 8 wherein:

A. said sequential comparison means includes:

i. a memory unit for storing instructions, certain instructions identifying a specific condition sensor to be tested or a specific controllable device to be activated, each of the certain instructions corresponding to an element in an expression, ii. an instruction register, and iii. means for generating signals in response to the contents of said instruction register to control operations defined by the instructions during each analysis step, B. said transition monitor including:

i. means responsive to said instruction register signals representing said certain instructions for generating enabling signals, ii. said storage means in said transition monitor including addressed decoding means responsive to the enabling signal and the identification of a condition sensor or controllable device for generating a signal corresponding to the stored state of the identified condition sensor or controllable device.

10. A system as recited in claim 9 wherein said transition word generator includes:

i. means for determining the direction of a transition, ii. means for determining the type instruction being processed, iii. means for generating the transition word identifying the transition direction, type of instruction and affected device, and iv. means responding to said transition word for altering the contents of the storage means location corresponding to the identified condition sensor or controllabe element.

11. A system as recited in claim 10 wherein said data processing system is characterized by a maximum rate at which it can accept data from said output register, said transition monitor additionally comprising:

i. a timer for defining a time interval corresponding to the maximum transfer rate, ii. an output flag means for starting said timer and setting said output flag, iii. means responsive to said timer and said flag for inhibiting further sequencing of said controller during the timed interval, and iv. means for resetting said flag when said output register empties to then enable further sequencing.

12. A system as recited in claim 10 wherein said transition monitor additionally comprises:

i. means for inhibiting control actions by said controller, and ii. means for causing said controller to sequentially test each sensor and controllable device whereby said storage means and said utilization device receive initial conditions.

13. A system as recited in claim 10 wherein said transition monitor additionally comprises:

i. a status register, ii. means for loading said status register, and iii. means for disabling said transition generator output for selected transitions in accordance with the control of said status register.

14. A system as recited in claim 10 wherein said data processing system includes an interrupt facility and said system is adapted to be connected to input/output devices, the appearance of data in said output register generating a priority interrupting signal.

15. A system as recited in claim 10 wherein said data processing system includes a memory and is adapted to store first and second lists in said memory, a first of said lists containing a reference sequence representing a predetermined operating sequence for said system, said data processing system additionally being programmed to:

i. receive data from said output register in sequence for storage in said list, ii. compare the contents of said first and second list in sequence, and iii. generate data for an output peripheral device including any deviations between said first and second lists.

16. A system as recited in claim 15 additionally being programmed to record the time each transition occurs.

* * * * *